United States Patent
Dellock et al.

(10) Patent No.: US 11,083,051 B2
(45) Date of Patent: Aug. 3, 2021

(54) HEATED RUNNING BOARD ASSEMBLY

(71) Applicant: Ford Global Technologies, LLC, Dearborn, MI (US)

(72) Inventors: Paul Kenneth Dellock, Northville, MI (US); Aaron Bradley Johnson, Allen Park, MI (US); Stuart C. Salter, White Lake, MI (US); Stephen Kenneth Helwig, Farmington Hills, MI (US); Jeffrey Alan Mesko, Manchester, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 479 days.

(21) Appl. No.: 16/032,445

(22) Filed: Jul. 11, 2018

(65) Prior Publication Data

US 2020/0022225 A1   Jan. 16, 2020

(51) Int. Cl.
*H05B 3/32* (2006.01)
*B60R 3/00* (2006.01)
*B60S 1/66* (2006.01)
*B60R 3/02* (2006.01)

(52) U.S. Cl.
CPC .............. *H05B 3/32* (2013.01); *B60R 3/002* (2013.01); *B60R 3/02* (2013.01); *B60S 1/66* (2013.01)

(58) Field of Classification Search
CPC .......... H05B 1/0277; H05B 3/00; H05B 3/56; H05B 2214/02; H05B 3/32; B60R 3/002; B60R 3/02; B60R 3/00; B60S 1/66

USPC ......... 99/202, 203, 213, 482, 497, 528, 548; 280/163, 166, 169
See application file for complete search history.

(56) References Cited

U.S. PATENT DOCUMENTS

| | | | |
|---|---|---|---|
| 5,605,642 A | 2/1997 | Nece | |
| 6,140,609 A * | 10/2000 | Jones | B60R 3/002 219/202 |
| 8,016,309 B2 | 9/2011 | Flajnik et al. | |
| 9,493,646 B2 | 11/2016 | Luo et al. | |
| 9,802,545 B1 | 10/2017 | Salter et al. | |
| 2003/0102690 A1* | 6/2003 | Gebreselassie | B60Q 3/745 296/97.23 |
| 2007/0296175 A1* | 12/2007 | Flajnik | B60R 3/002 280/169 |
| 2015/0108115 A1* | 4/2015 | Yoshimoto | H05B 1/0238 219/511 |

FOREIGN PATENT DOCUMENTS

JP   2009107597 A   5/2009

* cited by examiner

*Primary Examiner* — Phuong T Nguyen
(74) *Attorney, Agent, or Firm* — David Coppiellie; Carlson, Gaskey & Olds, P.C.

(57) ABSTRACT

An exemplary running board assembly includes a running board with a deck having a plurality of spaced-apart raised sections. The raised sections are made of a thermally conductive polymer and include an electrically conductive element configured to allow electric current to flow through the raised sections.

14 Claims, 3 Drawing Sheets

US 11,083,051 B2

HEATED RUNNING BOARD ASSEMBLY

TECHNICAL FIELD

This disclosure relates to a running board assembly for a motor vehicle, and in particular relates to a heated running board assembly and a corresponding method.

BACKGROUND

Sport utility vehicles (SUVs), trucks, pickup trucks, vans, and other vehicles, such as four wheel drive (4WD) vehicles, have a relatively high ground clearance, meaning the floor is at a relatively high elevation above the ground.

Running boards are known and are sometimes used by users when accessing items stored on the roof of the vehicle. Some running boards are fixed and held stationary relative to a vehicle body, while other running boards are retractable, meaning they are selectively moveable between a retracted position (sometimes referred to as a "stowed" position) and a deployed position.

SUMMARY

A running board assembly according to an exemplary aspect of the present disclosure includes, among other things, a running board including a deck having a plurality of spaced-apart raised sections made of a thermally conductive polymer. The raised sections further include an electrically conductive element configured to allow electric current to flow through the raised sections.

In a further non-limiting embodiment of the foregoing running board assembly, the electrically conductive element is an electrically conductive wire.

In a further non-limiting embodiment of any of the foregoing running board assemblies, the electrically conductive wire is coextruded together with the deck.

In a further non-limiting embodiment of any of the foregoing running board assemblies, the electrically conductive wire is a nichrome wire.

In a further non-limiting embodiment of any of the foregoing running board assemblies, the assembly includes a current source electrically coupled to the electrically conductive element, a temperature sensor, and a thermistor. Further, the current source, temperature sensor, and the thermistor are electrically coupled to the electrically conductive elements.

In a further non-limiting embodiment of any of the foregoing running board assemblies, the raised sections are made of a thermally conductive polypropylene.

In a further non-limiting embodiment of any of the foregoing running board assemblies, the raised sections are made of a thermally conductive polypropylene and a filler. The filler is one of graphite, stainless steel, copper, graphene, carbon nanotubes, and a ceramic material.

In a further non-limiting embodiment of any of the foregoing running board assemblies, the electrically conductive element is an electrically conductive polymer.

In a further non-limiting embodiment of any of the foregoing running board assemblies, the raised sections together define an uppermost surface of the running board.

In a further non-limiting embodiment of any of the foregoing running board assemblies, the deck includes a plurality of channels between adjacent raised sections.

In a further non-limiting embodiment of any of the foregoing running board assemblies, the channels are made of an electrically insulative material.

In a further non-limiting embodiment of any of the foregoing running board assemblies, the channels are made of about 70% polypropylene and about 30% of one of glass fibers, carbon fibers, and basalt fibers.

In a further non-limiting embodiment of any of the foregoing running board assemblies, the channels lie in a plane beneath a plane defined by the uppermost surface of the raised sections.

In a further non-limiting embodiment of any of the foregoing running board assemblies, each of the raised sections includes a pointed crown configured to manage water flow relative to the running board.

In a further non-limiting embodiment of any of the foregoing running board assemblies, each of the raised sections include at least one inclined surface adjacent the respective pointed crown.

A method according to an exemplary aspect of the present disclosure includes, among other things, heating a running board by causing current to flow through a plurality of spaced-apart raised sections of a deck of the running board. The raised sections are made of a thermally conductive polymer.

In a further non-limiting embodiment of the foregoing method, the raised sections are spaced-apart by channels, and the channels formed of an electrically insulative material.

In a further non-limiting embodiment of any of the foregoing methods, the raised sections each include an electrically conductive wire coextruded therewith.

In a further non-limiting embodiment of any of the foregoing methods, the heating step includes directing current from a current source to the electrically conductive wires.

In a further non-limiting embodiment of any of the foregoing methods, the method includes monitoring a temperature of the running board using a temperature sensor, and using a thermistor, adjusting the flow of current through the electrically conductive wires.

DETAILED DESCRIPTION

This disclosure relates to a running board assembly for a motor vehicle, and in particular relates to a heated running board and a corresponding method. An exemplary running board assembly includes a running board including a deck having a plurality of spaced-apart raised sections. The raised sections are made of a thermally conductive polymer and include an electrically conductive element configured to allow electric current to flow through the raised sections. The disclosed arrangement safely delivers heat to the top surface of the deck of the running board to melt any accumulated snow and ice. The disclosed arrangement may be made of relatively low cost components and using efficient manufacturing techniques, such as coextrusion. These and other benefits will be appreciated from the below description.

Figure 1:
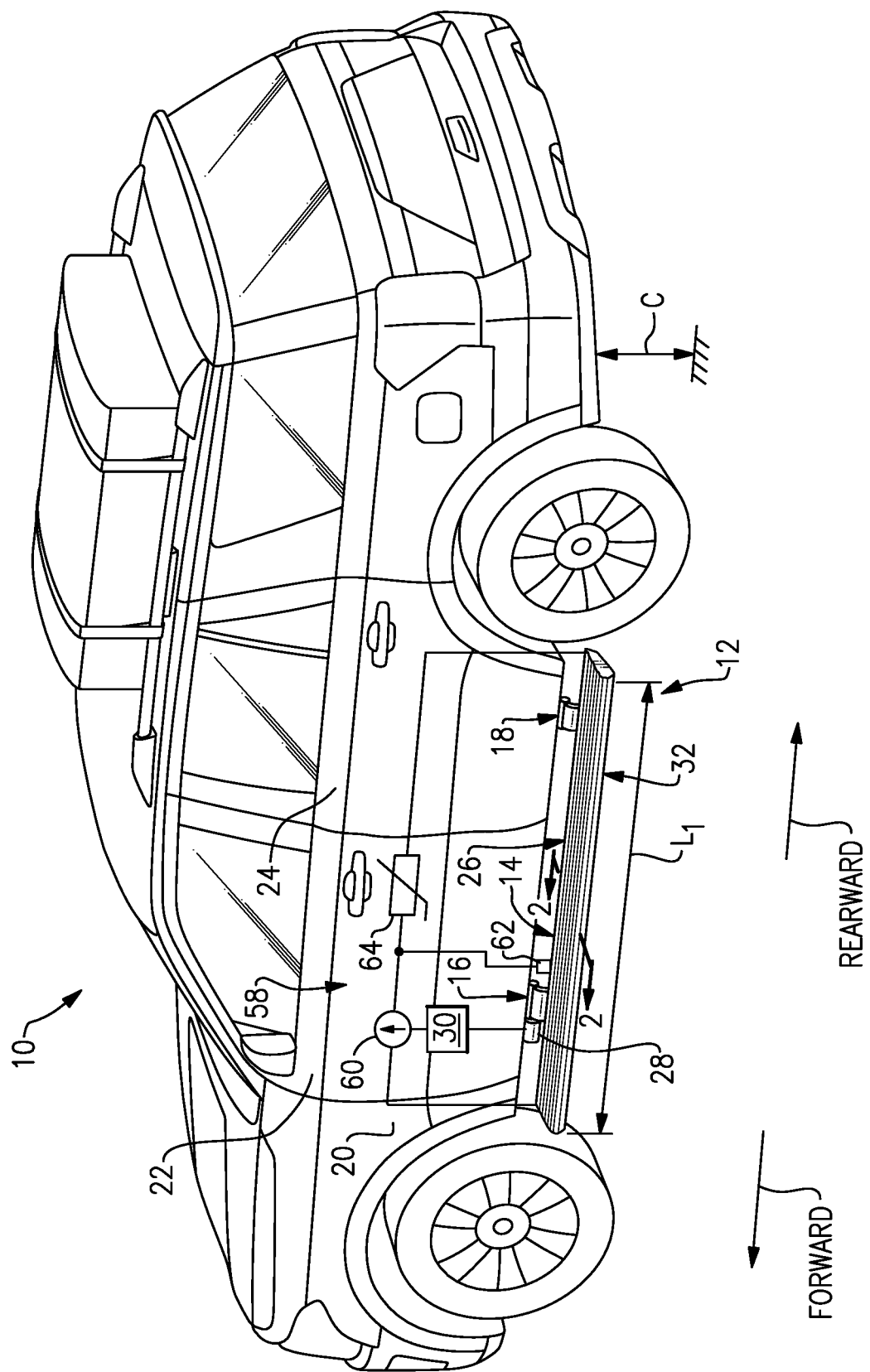
FIG. 1 is a perspective view of a motor vehicle with an example running board assembly.

Referring to the drawings, FIG. 1 is a rear-perspective view of a motor vehicle 10. The vehicle 10 has a relatively high clearance C, which is a distance between a ground surface and a floor of the vehicle 10. As shown, the vehicle 10 is a sport utility vehicle (SUV). While an SUV is pictured, this disclosure is also applicable to other types of vehicles having a high ground clearance, such as vans and trucks.

The vehicle 10 includes a running board assembly 12. In this example, the running board assembly 12 is a retractable running board assembly (or, a powered running board assembly), which is moveable from a retracted position to a deployed position. The running board assembly 12 is shown in a deployed position in FIG. 1. In this example, the retractable running board assembly 12 includes a running board 14 and first and second linkages 16, 18 rotatably connecting the running board 14 to a vehicle body 20, which includes the frame and paneling of the vehicle 10. While a retractable running board assembly is shown in FIG. 1, this disclosure extends to running board assemblies that are not retractable. In such assemblies, the running board 14 is held in the deployed position of FIG. 2 by one or more rigid support brackets.

The running board 14 has a length Li that extends in a direction parallel to the "forward" and "rearward" directions, which are labeled in FIG. 1 and correspond to the normal "forward" and "rearward" orientations of the vehicle 10. The running board 14 in this example spans at least a majority of the widths of a front door 22 and a rear door 24 of the vehicle 10. While only one running board 14 is shown in FIG. 1, it should be understood that a similar running board may be provided on an opposite side of the vehicle 10.

When in a deployed position, a user may step on the running board 14 as they enter and exit the vehicle 10. Specifically, the user may step on a deck 26 (or, step pad or stepping platform) of the running board 14, which in this example provides the uppermost surface of the running board 14.

In this example, the first linkage 16 is directly coupled to a motor 28, which is configured to move the running board 14 between the retracted and deployed positions. In one example, the motor 28 is in communication with a controller 30, which instructs the motor 28 to move the running board 14 between the retracted and deployed positions based on whether the doors 22, 24 are opened or closed, for example.

The controller 30 is shown schematically in FIG. 1. It should be understood that the controller 30 could be part of an overall vehicle control module, such as a vehicle system controller (VSC), or could alternatively be a stand-alone controller separate from the VSC. Further, the controller 30 may be programmed with executable instructions for interfacing with and operating the various components of the vehicle 10. The controller 30 may be operable in response to signals from a key fob, a vehicle infotainment system, or a mobile device of a user, for example. The controller 30 additionally includes a processing unit and non-transitory memory for executing the various control strategies and modes of the vehicle system.

In one example, the motor 28 is an electric motor, and is responsive to instructions from the controller 30 to selectively adjust a position of the first linkage 16. The second linkage 18 is configured to move in response to movement of the first linkage 16. In other words, the second linkage 18 is a follower linkage. In another example, however, the second linkage 18 could be directly coupled to the motor 28 and the first linkage 16 could be a follower linkage. Further, while two linkages 16, 18 are illustrated in FIG. 1, this disclosure extends to retractable running board assemblies having one or more linkages.

Figure 2:
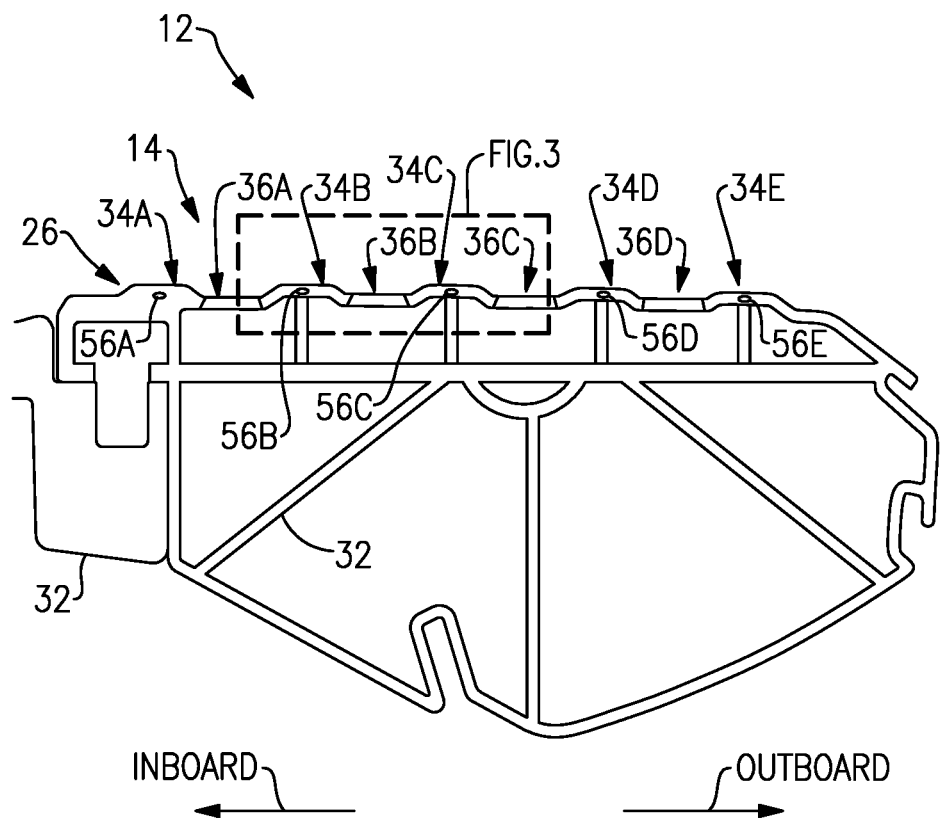
FIG. 2 is a cross-sectional view taken along line 2-2 and illustrates the detail of an example running board.

FIG. 2 is a cross-sectional view of the running board 14 taken along line 2-2 in FIG. 1. In particular, the running board 14 includes a base structure 32 configured to support the deck 26 from below and to couple the deck 26 to the body 20 of the vehicle 10. The base structure 32 include one or more support brackets made of a metallic material, such as stainless steel. The remainder of the base structure 32 may be made of glass-filled polypropylene, such as polypropylene filled with about 30% glass by volume. As discussed below, the running board 14 may be formed using a coextrusion process. The support brackets may be attached to the running board 14 after that coextrusion process, or as part of that process.

The running board 14 further includes a deck 26 supported by at least part of the base structure 32. In this example, the deck 26 includes a plurality of raised sections 34A-34E and a plurality of channels 36A-36D between adjacent raised sections 34A-34E in an alternating arrangement (i.e., raised section, channel, raised section, channel). While there are five raised sections 34A-34E and four channels 36A-36D illustrated in FIG. 2, this disclosure extends to running boards 14 having a different number of raised sections and channels.

The raised sections 34A-34E together define an uppermost surface of the running board 14. Further, in this disclosure, the raised sections 34A-34E are spaced-apart from one another in a lateral direction, which is a generally side-to-side direction relative to the normal attitude of the vehicle 10. The lateral directions are labeled in the figures as "outboard," which is moving away from the vehicle, and an opposite "inboard" direction.

Figure 3:
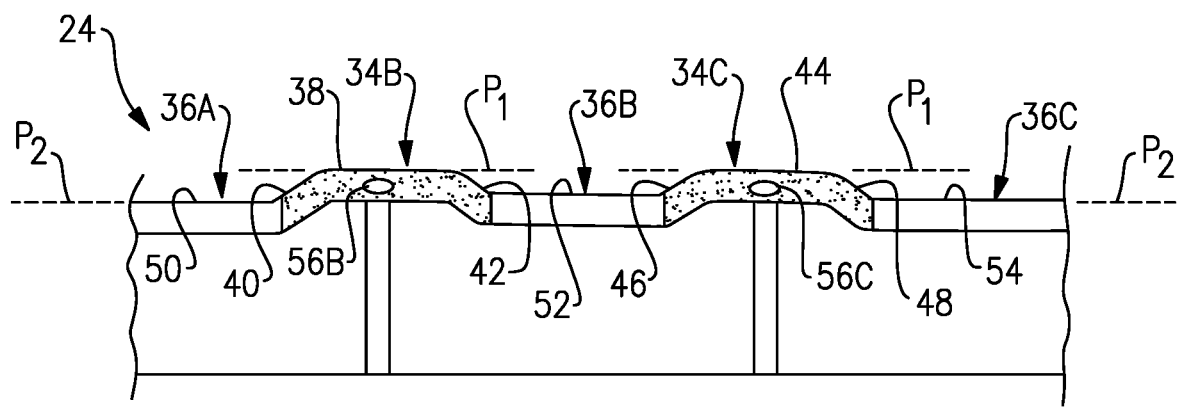
FIG. 3 is a close up view of the encircled area of the running board in FIG. 2, and in particular illustrates detail of the deck of the running board.

FIG. 3 illustrates shows a portion of the deck 26 in detail. In particular, FIG. 3 illustrates the raised sections 34B and 34C and the channels 36A-36C. While the remaining raised sections and channels are not shown in FIG. 3, it should be understood that they are arranged similarly.

Beginning with the raised section 34B, the raised section 34B includes a crown surface 38, which lies in a substantially horizontal plane $P_1$. On opposite lateral sides of the crown surface 38, the raised section 34B includes inclined surfaces 40, 42 leading to the channels 36A, 36B, respectively. The raised section 34C is arranged similarly, including a crown surface 44 lying in the plane $P_1$ and further including opposed inclined surfaces 46, 48 leading to the channels 36B, 36C, respectively. The channels 36A, 36B, 36C include upper surfaces 50, 52, 54 lying in a horizontal plane $P_2$, which is spaced-apart from, and beneath, plane $P_1$.

In this example, plane $P_1$ is the uppermost surface of the running board 14. Thus, the raised sections 34A-34E, and in particular the crown surfaces (i.e., crown surfaces 38, 44), define the uppermost surface of the running board 14, which is coextensive with plane $P_1$. In this way, the raised sections 34A-34E and channels 36A-36D provide the running board 14 with a plurality of ridges, which increases the amount of traction a user feels as they step on the running board 14 and assists with water management.

In order to increase the ease of use of the running board 14 in cold temperature conditions, such as snowy or icy conditions, the running board 14 is heated in this disclosure. In particular, in this disclosure, the raised sections 34A-34E are made of a thermally conductive material, such as a thermally conductive polymer, and the raised sections 34A-34E each include an electrically conductive element configured to allow electric current to flow through the raised sections. In this way, heat is applied directly to the uppermost surfaces of the running board 14, where it is efficiently dispersed.

Regarding the thermally conductive material of the raised sections 34A-34E, the raised sections 34A-34E are made of a thermally conductive polypropylene in one example. In a further example, the raised sections 34A-34E are made of a thermally conductive polypropylene and further include a filler. The filler may account for about 25% of the raised sections 34A-34E by volume, and the filler may be one of graphite, stainless steel, copper, graphene, carbon nanotubes, and a ceramic material. In one example, the raised sections 34A-34E have a thermal conductivity of 5 watts-per-meter-Kelvin, which is substantially increased over standard polymers (i.e., about 20 times the thermally conductivity of a standard polymer). This disclosure is not limited to any particular material type or filler for the raised sections 34A-34E, and extends to other thermally conductive materials.

Regarding the electrically conductive element of the raised sections 34A-34E, the raised sections 34A-34E in one example are each coextruded with an electrically conductive wire 56A-56E. The electrically conductive wires 56A-56E are embedded directly into the raised sections 34A-34E just beneath a respective crown surface (i.e., crown surfaces 38, 44) and laterally between the opposed inclined surfaces (i.e., inclined surfaces 40, 42, 46, 48).

The electrically conductive wires 56A-56E are nichrome (NiCr) wires in one example. The electrically conductive wires 56A-56E may be composed of about 80% nickel and 20% chrome, and meet ASTM B267 standards for resistance wire, in one example. The electrically conductive wires 56A-56E may be 24 gage wires in one example. This disclosure is not limited to any particular wire size, and is not limited to nichrome wires. In other words, this disclosure extends to other types of electrically conductive or resistive wires.

In an alternative embodiment of this disclosure, the raised sections 34A-34E do not include electrically conductive wires, and are instead made of an electrically conductive polymer. Such materials are sometimes referred to as intrinsically conductive polymers (ICPs), and include organic polymers that conduct electricity. To this end, the raised sections 34A-34E may be made of an electrically conductive and thermally conductive polymer.

The electrically conductive elements, such as the electrically conductive wires 56A-56E or the conductive polymer, extend substantially the entire length Li of the running board 14. The electrically conductive elements may be arranged relative to an electrical circuit in series, parallel, or some combination of the two. An example electrical circuit will be discussed below.

In order to prevent a short between the electrically conductive elements, the channels 36A-36D are made of an electrically insulative material in this example. For instance, in one example, the channels 36A-36D are made of about 70% polypropylene and include about 30% of a filler material (percentages are by volume in this example). The filler material may be of one of glass fibers, carbon fibers, and basalt fibers. This disclosure is not limited to a particular material type, and extends to other electrically insulative materials and structural fibers. Further, in an alternative embodiment, the channels 36A-36D may be made of an electrically conductive material, such as graphite, provided that the electrically conductive wires 56A-56E are coated with an electrically insulative material.

In one example of this disclosure, the running board 14 is made using a coextrusion process. In particular, the running board 14 is made by pressing the different materials forming the base structure 32, raised sections 34A-34E, channels 36A-36D, and the electrically conductive wires 56A-56E, if present, together through a die. This disclosure is not limited to running boards 14 manufactured by coextrusion, although coextrusion does provide certain benefits, including reduced cost, ease of manufacture, etc. Further, coextrusion allows one to readily embed the electrically conductive wires 56A-56E relatively close to the uppermost surface of the deck 26, which increases the ease of heating the deck 26.

With reference back to FIG. 1, the vehicle 10 and running board assembly 12 include an electrical circuit 58 arranged relative to the running board 14 in order to direct current through the electrically conductive elements of the raised sections 34A-34E. In the example where the electrically conductive elements are electrically conductive wires 56A-56E, the electrically conductive wires 56A-56E may be connected to the electrical circuit 58 in series, parallel, or some combination of the two. In FIG. 1, the electrical circuit 58 is electrically coupled to the electrically conductive wires 56A-56E at opposed ends of the running board 14. The electrical circuit 58 may be coupled to the electrically conductive wires 56A-56E in other ways, however. Further, while reference is made to the electrically conductive wires 56A-56E, the electrical circuit 58 may be used relative to raised sections 34A-34E that do not include electrically conductive wires and instead are made of an electrically conductive polymer, as discussed above.

The electrical circuit 58 in this example includes a current source 60, which may be provided by a battery of the vehicle 10, a temperature sensor 62, and a thermistor 64, each of which are electrically coupled to the running board 14, and in particular to the electrically conductive wires 56A-56E. The electrical circuit 58 may be electrically coupled to the controller 30 in one example, and the components of the electrical circuit 58 may be responsive to commands from the controller 30. In another example, the electrical circuit 58 is self-regulating and is not electrically coupled to the controller 30.

In one example method of use, the temperature sensor 62 is configured to generate a signal indicative of the temperature of the running board 14. Another temperature sensor may be used to generate a signal indicative of ambient air temperature in other examples. If the temperature of the running board 14 is below a predetermined threshold, such as below 3° C., the electrical circuit 58 may activate and begin directing current through the electrically conductive wires 56A-56E. In one example, when the sensed temperature falls below the threshold, the controller 30 commands the current source 60 to direct current to the electrically conductive wires 56A-56E, which heats the running board 14. The level of current may be regulated by the controller 30 or the thermistor 64. In one example, the thermistor 64 is a positive temperature coefficient (PTC) thermistor, which increases in resistance as temperature rises. Thus, as temperature rises, the resistance of the thermistor 64 increases, and less current is directed to the electrically conductive wires 56A-56E.

The thermistor 64 in this example may have a switching temperature of about 60° C. In particular, the thermistor 64 may have a resistance of about 2 ohms at 60° C., a resistance of about 1,000 ohms at 90° C., and a resistance of about 10,000 ohms at 105° C., the latter of which effectively stops any current flow. In this way, as the running board 14 raises in temperature, the electrical circuit 58 begins to reduces the current directed through electrically conductive wires 56A-56E. To this end, the thermistor 64 may be electrically coupled to the temperature sensor 62 and/or the controller 30 and/or an ambient temperature sensor, if present. This disclosure is not limited to any particular thermistor, and an appropriate thermistor may be selected based on desired behavior.

In one example of this disclosure, during a heating operation, the electrical circuit 58 provides a level of current to the electrically conductive wires 56A-56E such that the electrically conductive wires 56A-56E are heated to between about 60-80° C. This temperature range allows for efficient operation, is safe for a user, melts away ice and snow, and prevents accumulation of the same.

Figure 4A:
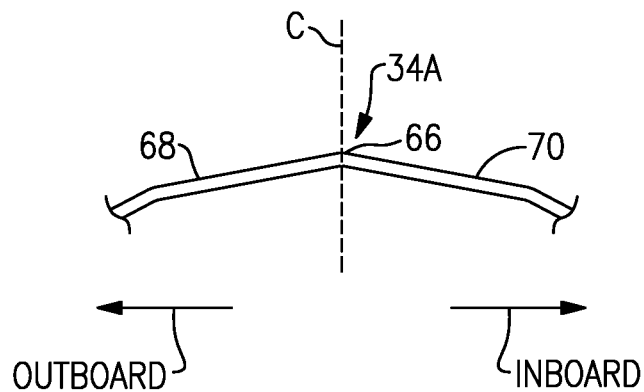
FIG. 4A is a view of a first alternate arrangement of a raised section of the running board.
Figure 4B:
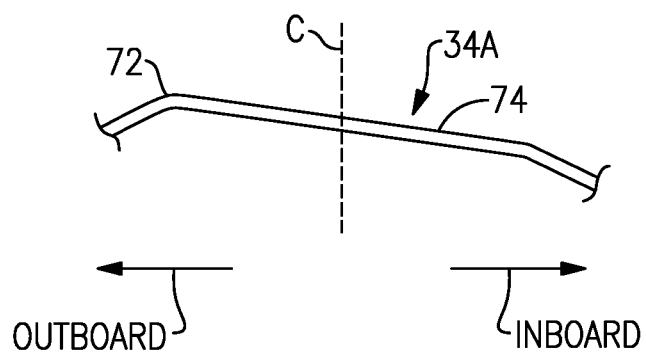
FIG. 4B is a view of a second alternate arrangement of the raised section of the running board.
Figure 4C:
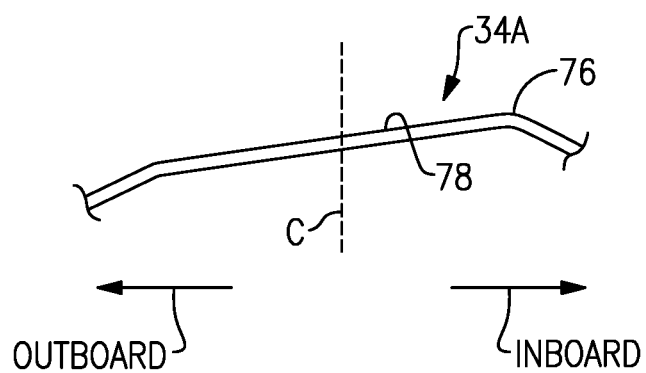
FIG. 4C is a view of a third alternate arrangement of the raised section of the running board.

In one aspect of this disclosure, the running board 14 is configured to manage water from melting snow and ice. FIGS. 4A-4C illustrate three alternate arrangements of the raised sections of the running board 14. In particular, FIGS. 4A-4C illustrate the raised section 34A, although it should be understood that each of the raised sections 34A-34E may resemble any one of the arrangements illustrated herein.

In each of the arrangements of FIG. 4A-4C, the raised section 34A includes a pointed crown, as opposed to the blunt, horizontally flat crown surfaces 38, 44 of FIG. 3. The raised section 34A also includes at least one inclined surface adjacent the pointed crown.

In a first alternate arrangement, the raised section 34A includes a pointed crown 66 (FIG. 4A) coincident with a centerline C of the raised section 34A, and opposed inclined surfaces 68, 70 on either side of the centerline C. In FIG. 4A, the raised section 34A is substantially symmetrical about the centerline C. In a second alternate arrangement, the raised section 34A includes a pointed crown 72 (FIG. 4B) spaced-laterally outboard of the centerline C and an inclined surface 74 sloped downward as it moves laterally inboard. In this way, the arrangement of FIG. 4B causes water to flow in the inboard direction relative to the raised section 34A. In a third alternate arrangement, which is substantially the opposite of the FIG. 4B arrangement, the raised section 34A includes a pointed crown 76 (FIG. 4C) spaced-laterally inboard of the centerline C and an inclined surface 78 sloped downward as it moves laterally outboard. In this way, water flows outboard of the raised section 34A. In each of these examples, the pointed crowns 66, 72, 76 together define the plane $P_1$, which is coextensive with the uppermost surface of the running board 14. While pointed crowns may have added benefits, this disclosure is not limited to any particular arrangement of the raised section 34A.

It should be understood that terms such as "about," "substantially," and "generally" are not intended to be boundaryless terms, and should be interpreted consistent with the way one skilled in the art would interpret those terms. Further, directional terms such as "below," "forward," "rearward," "upward," "downward," "vertical," "horizontal," etc., are used for purposes of explanation only and should not otherwise be construed as limiting.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A heated running board assembly for a motor vehicle, comprising:
   a running board including a deck having a plurality of spaced-apart raised sections made of a thermally conductive polymer and including electrically conductive wires configured to be heated and to allow electric current to flow through the raised sections,
   wherein each of the raised sections includes a pointed crown configured to manage water flow relative to the running board,
   wherein each of the raised sections include at least one inclined surface adjacent the respective pointed crown,
   wherein each of the raised sections is configured such that the pointed crown is coincident with a respective centerline thereof,
   wherein each of the raised sections includes first and second opposed inclined surfaces on either side of the respective centerline,
   wherein each of the raised sections is symmetrical about the respective centerline,
   wherein each of the raised sections includes an electrically conductive wire embedded directly into the respective raised section, and
   wherein each of the electrically conductive wires is arranged vertically beneath a respective one of the pointed crowns and laterally between respective first and second opposed inclined surfaces.

2. The heated running board assembly as recited in claim 1, wherein the electrically conductive wires are coextruded together with the deck.

3. The heated running board assembly as recited in claim 1, wherein the electrically conductive wires are nichrome wires.

4. The heated running board assembly as recited in claim 1, further comprising:
   a current source;
   a temperature sensor; and
   a thermistor, wherein the current source, temperature sensor, and the thermistor are electrically coupled to the electrically conductive wires.

5. The heated running board assembly as recited in claim 1, wherein the raised sections are made of a thermally conductive polypropylene.

6. The heated running board assembly as recited in claim 5, wherein the raised sections are made of a thermally conductive polypropylene and a filler, the filler being one of graphite, stainless steel, copper, graphene, carbon nanotubes, and a ceramic material.

7. The heated running board assembly as recited in claim 1, wherein the raised sections together define an uppermost surface of the running board.

8. The heated running board assembly as recited in claim 1, wherein the deck includes a plurality of channels between adjacent raised sections.

9. The heated running board assembly as recited in claim 8, wherein the channels are made of an electrically insulative material.

10. The heated running board assembly as recited in claim 9, wherein the channels are made of about 70% polypropylene and about 30% of one of glass fibers, carbon fibers, and basalt fibers.

11. The heated running board assembly as recited in claim 8, wherein the channels lie in a plane beneath a plane defined by the uppermost surface of the raised sections.

12. The heated running board assembly as recited in claim 11, wherein each electrically conductive wire extends through a respective one of the raised sections along the entire length of the running board.

13. The heated running board assembly as recited in claim 8, wherein each of the channels includes an electrically conductive material and the electrically conductive wires are coated with an electrically insulative material.

14. The heated running board assembly as recited in claim 1, wherein each of the raised sections is made of an electrically conductive polymer and each of the channels is made of an electrically insulative material.

* * * * *